United States Patent
Wu

(10) Patent No.: US 8,298,665 B2
(45) Date of Patent: Oct. 30, 2012

(54) POWER TRANSMISSION BELT

(75) Inventor: Shawn Xiang Wu, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 579 days.

(21) Appl. No.: 12/145,162

(22) Filed: Jun. 24, 2008

(65) Prior Publication Data
US 2009/0011883 A1    Jan. 8, 2009

Related U.S. Application Data

(60) Provisional application No. 60/947,807, filed on Jul. 3, 2007.

(51) Int. Cl.
*F16G 1/28* (2006.01)
*F16G 5/20* (2006.01)
*B29D 22/00* (2006.01)
*B29D 23/00* (2006.01)
*B31B 45/00* (2006.01)
*B32B 1/08* (2006.01)
*B32B 27/32* (2006.01)
*B32B 15/08* (2006.01)
*D02G 3/00* (2006.01)

(52) U.S. Cl. ....... 428/364; 474/202; 474/205; 428/34.1; 428/35.2; 428/35.3

(58) Field of Classification Search ................. 474/202, 474/205, 237, 242, 260, 263, 265, 267, 268; 428/34.1, 35.2, 35.3, 35.5, 35.7, 35.8, 36.3, 428/36.8, 36.9, 36.91, 36.92, 364
See application file for complete search history.

(56) References Cited

U.S. PATENT DOCUMENTS

| | | | |
|---|---|---|---|
| 3,090,716 A * | 5/1963 | Stevens | 474/260 |
| 3,469,001 A | 9/1969 | Keefe | |
| 3,584,516 A * | 6/1971 | Burpulis | 474/265 |
| 3,992,959 A | 11/1976 | Cicognani | |
| 4,003,269 A | 1/1977 | Haines | |
| 4,534,437 A | 8/1985 | Howerton et al. | |
| 4,571,230 A | 2/1986 | Woodland | |
| 4,617,075 A | 10/1986 | Wetzel et al. | |

(Continued)

FOREIGN PATENT DOCUMENTS

WO    WO96/02585    1/1996

OTHER PUBLICATIONS

Jean-Francois Fritsch, Cracking the Rayon Code, Tire Tech 2005, Koln, Germany (Feb. 23, 2005).

(Continued)

*Primary Examiner* — Michael Mansen
*Assistant Examiner* — Henry Liu
(74) *Attorney, Agent, or Firm* — J. A. Thurnau, Esq.; P. N. Dunlap, Esq.

(57) ABSTRACT

A power transmission belt comprising a polyester tensile cord having a heat shrinkage at 100° C. of less than 1% and/or a heat shrinkage at 150° C. of less than about 1.5% and/or a dimensional stability index of less than about 6%. The belt has a heat shrinkage after 24 hours at 100° C. of less than 1%. The polyester may be that sold under the trade name A360 or A363 by Performance Fibers, Inc. or equivalent polyethylene terephthalate. The tensile cord is particularly suited for use in V-belts for variable speed drives.

7 Claims, 2 Drawing Sheets

U.S. PATENT DOCUMENTS

| | | | | |
|---|---|---|---|---|
| 4,741,726 A | * | 5/1988 | Zarife et al. | 474/268 |
| 4,778,437 A | * | 10/1988 | Wach et al. | 474/260 |
| 4,968,288 A | * | 11/1990 | Lecouturier et al. | 474/242 |
| 5,049,447 A | * | 9/1991 | Shindo et al. | 428/373 |
| 5,067,538 A | | 11/1991 | Nelson et al. | |
| 5,244,436 A | | 9/1993 | Kurokawa | |
| 5,484,343 A | * | 1/1996 | Nakajima et al. | 474/266 |
| 5,610,217 A | | 3/1997 | Yarnell et al. | |
| 5,645,504 A | | 7/1997 | Westhoff | |
| 5,658,655 A | * | 8/1997 | Stanhope | 442/364 |
| 5,807,194 A | | 9/1998 | Knutson et al. | |
| 5,860,883 A | * | 1/1999 | Jonen et al. | 474/205 |
| 5,888,330 A | | 3/1999 | Onaka et al. | |
| 5,954,606 A | * | 9/1999 | Mishima et al. | 474/267 |
| 6,132,328 A | * | 10/2000 | Kinoshita et al. | 474/260 |
| 6,176,799 B1 | * | 1/2001 | Kinoshita et al. | 474/237 |
| 6,240,993 B1 | | 6/2001 | Onaka et al. | |
| 6,329,053 B2 | * | 12/2001 | Kim et al. | 428/364 |
| 6,358,171 B1 | | 3/2002 | Whitfield | |
| 6,358,609 B2 | * | 3/2002 | Kinoshita et al. | 428/375 |
| 6,419,605 B1 | * | 7/2002 | Takahashi et al. | 474/237 |
| 6,485,386 B2 | | 11/2002 | Yuan et al. | |
| 6,500,086 B2 | | 12/2002 | Serkh et al. | |
| 6,503,164 B2 | * | 1/2003 | Ito | 474/263 |
| 6,511,747 B1 | * | 1/2003 | Cho et al. | 428/364 |
| 6,519,925 B2 | * | 2/2003 | Kim et al. | 57/237 |
| 6,595,883 B1 | | 7/2003 | Breed et al. | |
| 6,616,558 B2 | * | 9/2003 | South | 474/260 |
| 6,620,068 B2 | | 9/2003 | Ito et al. | |
| 6,695,733 B2 | | 2/2004 | Knutson | |
| 6,764,422 B2 | * | 7/2004 | Hasaka et al. | 474/263 |
| 6,764,623 B2 | * | 7/2004 | Kim et al. | 264/103 |
| 6,793,599 B2 | | 9/2004 | Patterson et al. | |
| 6,962,639 B2 | | 11/2005 | Ito et al. | |
| 7,189,785 B2 | | 3/2007 | Okuno | |
| 2001/0034282 A1 | * | 10/2001 | Hasaka et al. | 474/260 |
| 2001/0039226 A1 | * | 11/2001 | Ito | 474/263 |
| 2001/0039988 A1 | * | 11/2001 | Kim et al. | 152/556 |
| 2001/0044353 A1 | * | 11/2001 | Nosaka et al. | 474/260 |
| 2002/0041048 A1 | * | 4/2002 | Kim et al. | 264/103 |
| 2002/0041962 A1 | * | 4/2002 | Kim et al. | 428/375 |
| 2002/0042317 A1 | * | 4/2002 | South | 474/264 |
| 2002/0187869 A1 | | 12/2002 | Martin et al. | |
| 2003/0059612 A1 | * | 3/2003 | Cho et al. | 428/375 |
| 2004/0265578 A1 | * | 12/2004 | Kwon et al. | 428/364 |
| 2005/0003918 A1 | * | 1/2005 | Hayashi | 474/263 |
| 2005/0037882 A1 | * | 2/2005 | Hineno et al. | 474/263 |
| 2005/0143209 A1 | * | 6/2005 | Shibutani | 474/260 |
| 2005/0148756 A1 | * | 7/2005 | Kwon et al. | 528/272 |
| 2005/0176540 A1 | * | 8/2005 | Ito | 474/237 |
| 2006/0105873 A1 | * | 5/2006 | Sato et al. | 474/263 |
| 2007/0023127 A1 | * | 2/2007 | Onita et al. | 156/140 |
| 2007/0111834 A1 | * | 5/2007 | Matsuda et al. | 474/202 |
| 2007/0249451 A1 | * | 10/2007 | Wu et al. | 474/263 |
| 2007/0249452 A1 | * | 10/2007 | South | 474/263 |

OTHER PUBLICATIONS

Ken Norberg, "Speeding Ahead, Performance Fibers Sets Pace for Tire and Automotive Safety Fibers", article reprint from International Fiber Journal.

M.D. Cole; "Growing to Meet Global Demand—Performance Fibers Enters a New Era"; International Fiber Journal; Jun. 2005; XP002500327; Internet Article.

Performance Fibers; "Performance Fibers Introduces New High-Strength Fibers"; Jun. 11, 2007; XP002500328; Frankfurt, Germany;Internet Article.

International Search Report; PCT/US/2008/007785; Apr. 11, 2008.

* cited by examiner

POWER TRANSMISSION BELT

REFERENCE TO RELATED APPLICATION

This application claims priority from U.S. provisional patent application Ser. No. 60/947,807 filed Jul. 3, 2007.

BACKGROUND OF THE INVENTION

1. Field of the Invention

This invention relates generally to a power transmission belt having improved tensile cord, more particularly to a power transmission belt having low shrinkage tensile cord comprising dimensionally stable polyester fibers, and specifically to a V-belt for variable speed or clutching applications having a tensile cord of dimensionally stable polyester fibers sold under the trade name A360 or A363 by Performance Fibers, Inc.

2. Description of the Prior Art

Many cords of different materials for forming the tensile cord of power transmission belts are known. The need for dimensional stability is known for toothed belt applications, and many proposals for achieving dimensional stability exist. One aspect of dimensional stability is low elongation during use, i.e. low growth or high modulus. Another aspect of dimensional stability is heat shrinkage after the belt is warmed up due to running. Dimensional instability problems are normally associated with cord made of thermoplastic polymers such as polyester (such as polyethylene terephthalate or "PET"), nylon, polyvinyl-alcohol, and polyethylene naphthalate ("PEN"). A "Dimensional Stability Index" ("DSI") may be defined as the sum of percent elongation at 45N per 1000 denier ("d") (4.5 g/d) plus the percent free heat shrinkage in air at a given temperature such as 177° C. (according to the method of ASTM D885). Examples which address one or more issues related to dimensional stability of toothed belts include U.S. Pat. No. 3,992,959 to Cicognani, U.S. Pat. No. 6,695,733 to Knutson, U.S. Pat. No. 6,358,171 to Whitfield, and U.S. Pat. No. 5,807,194 to Knutson et al. Many of these proposals include very expensive materials such as PBO, carbon fiber, aramid or polyethylenenaphthalate (PEN). Other cord materials proposed for such applications include fiber glass cord, which requires complicated treating processes, and rayon, which has relatively low tensile strength though still more expensive than PET. Thus, PET is generally used where a good, low-cost cord is needed, but where either high elongation or high heat shrinkage can be tolerated. Applications requiring more dimensional stability, i.e. both low elongation and low heat shrinkage, generally require rayon, aramid, glass, carbon, or PEN, PBO, PVA, all of which are higher-performance but also higher in cost. However, many belt applications which have increasing demands for dimensional stability are high-volume applications which require more economical approaches than these proposed materials.

In particular, variable speed applications such as scooters, snowmobiles, and the like place extreme performance requirements on V-belts in general, and on the tensile cord materials in particular. One problem is that elongation and/or heat shrinkage of the belt during use changes the shifting and other performance characteristics of the variable speed drive. As another example, v-belt drives with a clutching engagement mechanism as used in power tools, lawn mowers, and the like require dimensional stability for proper clutch operation, as described for example in U.S. Pat. No. 6,595,883 to Breed et al. As a third example, timing belts or toothed belts or synchronous belts also require excellent dimensional stability to maintain proper meshing with associated toothed pulleys or sprockets. While laundry lists of cord materials for such belts often include materials such as polyester, rayon, or nylon, it is generally recommended that higher modulus and higher strength and higher cost materials such as aramid, carbon, glass, be used in such applications demanding extreme dimensional stability. Polyester in particular is economical, and can be stretched during processing to provide high modulus and low elongation, but then has excessive heat shrinkage, which may be useful for maintaining tension in some belt drives, but is detrimental for variable speed drives requiring dimensional stability. Thus, improved polyesters, including the so-called dimensionally stable polyester ("DSP") or high-modulus, low-shrinkage polyester ("HMLS" polyester) are economical but still exhibit insufficient dimensional stability for some applications. An example of a DSP having a DSI of 8% to 11% is disclosed in U.S. Pat. No. 5,067,538. A cord with DSI less than about 6% is not disclosed or suggested. The need remains for a more economical cord material with suitable high performance and dimensional stability characteristics for v-belts for variable speed applications, including clutching applications, and the like.

SUMMARY

The present invention is directed to systems and methods which provide a dimensionally stable variable speed drive belt. The invention also provides advantages of extremely low heat shrinkage and high modulus, compared to belts using conventional DSP or HMLS polyester.

The primary aspect of the invention is a power transmission belt having a tensile cord with polyester fiber. The cord is characterized by at least one of a heat shrinkage at 100° C. of less than 1%, a heat shrinkage at 150° C. of less than about 1.5%, and a Dimensional Stability Index of less than about 6%; and the belt is characterized by a heat shrinkage after 24 hours at 100° C. of less than 1%. The DSI is calculated as the sum of percent elongation at 4.5 g/d tensile load and percent heat shrinkage in air at 177° C.

The polyester may be that sold under the trade name A360 or A363 by Performance Fibers, Inc. or equivalent.

The inventive belt may be a V-belt, a synchronous belt, or a multi-v-ribbed belt. The belt may be adapted for use in a variable-speed belt drive.

In a further aspect of the invention, the cord may comprise six yarns of A360 fiber in a ⅔ cable construction.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
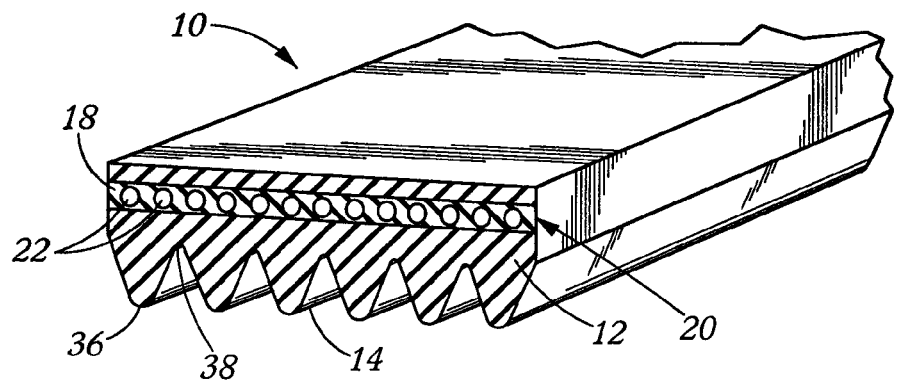
FIG. 1 is a perspective view, with parts in section, of a portion of a multi-V-ribbed belt constructed in accordance with an embodiment of the present invention.
Figure 2:
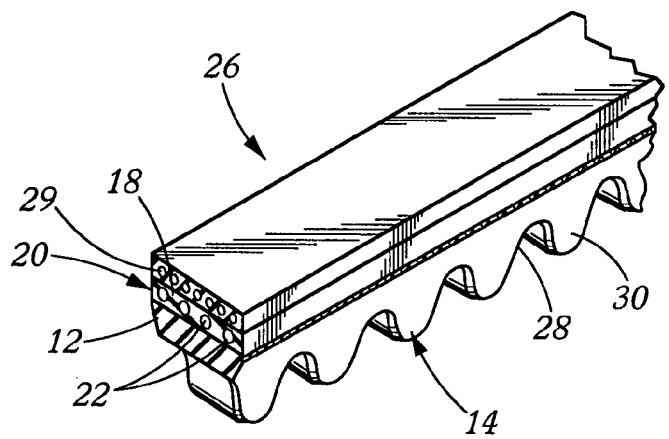
FIG. 2 is a perspective view, with parts in section, of a portion of a V-belt constructed in accordance with another embodiment of the present invention.
Figure 3:
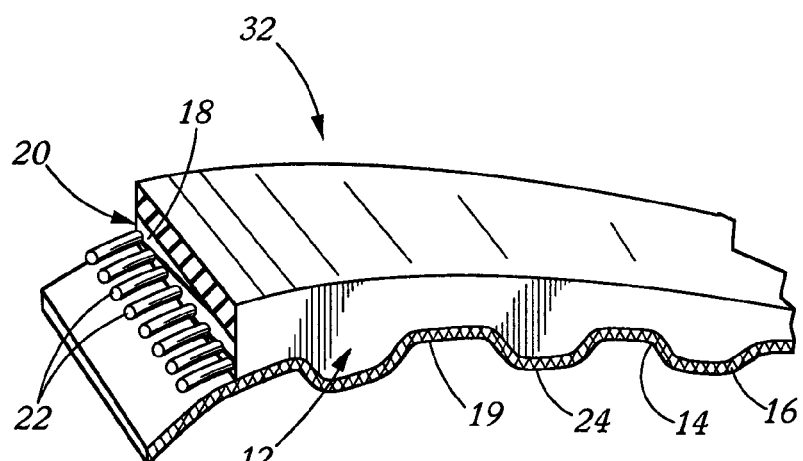
FIG. 3 is a perspective view, with parts in section, of a portion of a synchronous belt constructed in accordance with another embodiment of the present invention.

FIGS. 1-3 illustrate three belt embodiments of the invention, each having tensile cord 22. The primary improvement is the use for tensile cord 22 of a very low-shrinkage type of polyester yarn, for example that sold under the trade name A360 or A363 by Performance Fibers, Inc. or equivalent. The very low shrinkage polyester yarn useful in carrying out the invention may be characterized by a Dimensional Stability Index ("DSI") of less than about 6%. A DSI of 6% is significantly lower than found in normal DSP or HMLS polyester cords. DSI includes a modulus component and a shrinkage component. The modulus component is expressed as Elongation at Specified Load ("EASL") which actually varies inversely with modulus. The specified load of 4.5 g/d is used herein unless otherwise noted. The Heat Shrinkage ("HS") component of DSI for a yarn or tensile cord is generally determined according to ASTM D885, with various modifications depending on supplier preference, instrument design, and the like. The HS component is usually based on a pretension of 0.05 g/d and a temperature of 177° C. and measured in air. Other variations which will be referred to below include measuring in oil and at temperatures of 100° C. or 15° C. The tensile cord useful in the present invention may also be characterized by heat shrinkage at 100° C. of less than 1%, or by heat shrinkage at 150° C. of less than about 1.5%. Table 1 shows yarn properties for A360 and various other and conventional materials and will be discussed in more detail below.

Referring to FIG. 1, multi-V-ribbed belt 10 in accordance with an embodiment of the present invention is shown generally. Multi-V-ribbed belt 10 includes elastomeric main belt body portion 12, or undercord, and sheave contact portion 14 positioned along the inner periphery of main belt body portion 12. The word, "sheave" as used in this context includes conventional pulleys and sprockets used with a power transmission belt, and also rollers and like mechanisms. The particular sheave contact portion 14 of the belt of FIG. 1 is in the form of a plurality of ribs comprising raised areas or apexes 36 alternating with a plurality of trough areas 38 defining there between oppositely facing sides. In each of the instances of FIGS. 1-2, sheave contact portion 14 is integral with main belt body portion 12 and may be formed from the same elastomeric material(s) as described below. In FIG. 3 however, sheave contact portion 14 can be seen to comprise reinforcing fabric 24, explained in further detail below, as conventionally utilized in synchronous belt building configurations, and is thus formed of a material other than that of main belt body portion 12 in that embodiment of the present invention.

Tensile or load-carrying cord section 20 is positioned above undercord 12 for providing support and strength to belt 10. In the illustrated form the tensile section comprises at least one longitudinally extending tensile cord 22, described in further detail below, aligned along the length of the belt, and in accordance with various embodiments of the present invention, is at least partially in contact with or is embedded in adhesive rubber member 18 described in further detail below. The skilled practitioner would readily appreciate that in the several FIGS. 1-3, adhesive rubber member 18 is illustrated in exaggerated form in order to visually distinguish it from the other elastomeric portions of the belt. In actuality, the cured composite is frequently visually indistinguishable from the surrounding elastomeric belt body portion except in cases, e.g., where one and not the other of adhesive rubber member 18 and undercord 12 is fiber loaded. The adhesive rubber member 18 may actually be of the same material as elastomeric main belt body 12.

A reinforcing fabric (not shown in FIG. 1) may optionally be utilized and in the case of V-belts and multi-V-ribbed belts intimately fits along the surface of the belt opposite sheave contact portion 14 to form a face cover or overcord for the belt. The fabric may be of any desired configuration such as a conventional weave consisting of warp and weft threads at any desired angle, or may consist of warp threads held together by spaced pick cords as exemplified by tire cord fabric, or of a knitted or braided configuration, or of a nonwoven configuration, or paper, or plastic film, and the like. The fabric may be friction- or skim-coated with the same or different elastomer composition as that of elastomeric main belt body 12. More than one ply of fabric may be employed. If desired, the fabric may be cut or otherwise formed to be arranged on a bias so that the strands form an angle with the direction of travel of the belt. One embodiment of such reinforcing fabric use is shown in FIG. 2 wherein rubber-skim coated tire cord fabric 29, is illustrated in exaggerated form. Usage of nonwoven or paper materials is described for example in U.S. Pat. No. 6,793,599 to Patterson et al., and the contents of that patent with respect to same are incorporated herein by reference. Usage of plastic film is described for example in U.S. Pat. Application Publication No. 2002/0187869, and the contents of that publication with respect to same are incorporated herein by reference.

Referring to FIG. 2, notched V-belt 26 is illustrated. V-belt 26 includes main elastomeric belt body portion 12 similar to that illustrated in FIG. 1, and tensile or load-carrying section 20 in the form of one or more tensile cords 22 embedded in optional adhesive rubber member 18, also similar to that illustrated in FIG. 1. Main elastomeric belt body portion 12, adhesive rubber member 18, and load-carrying section 20 of V-belt 26 may be constructed from the same materials as described above for FIG. 1.

V-belt 26 also includes sheave contact portion 14 as in multi-V-ribbed belt 10 of FIG. 1. The side surfaces of elastomeric main belt body portion 12, or in the case of a V-belt as illustrated, of the compression section, serve as the driving surfaces of belt 26. In the embodiment illustrated, sheave contact portion 14 is in the form of alternating notch depression surfaces or troughs 28 and toothed projections 30. Alternating depression surfaces 28 and projections 30 may preferably follow a generally sinusoidal path as illustrated which serves to distribute and minimize bending stresses as sheave contact portion 14 passes around pulleys during operation.

While in the illustrated embodiment, V-belt 26 is in the form of a raw-edged belt, reinforcing fabric 29 as described above may moreover be employed, either as a face cover or overcord for the belt as shown, or fully encompassing the belt to form a banded V-belt. It should be understood that the invention is primarily concerned with V-belts used in variable speed drives, but it is contemplated that the invention may also be useful in multi-v-ribbed and toothed belts, as well as other applications of V-belts. It should be understood that a variable speed v-belt may be proportioned wider than its thickness, although FIG. 2 shows the opposite proportion. A variable-speed v-belt for very high loads may comprise an endless belt having a plurality of blocks attached thereto, providing extreme rigidity transverse to the belt longitudinal direction and flexibility in the longitudinal direction.

Referring to FIG. 3, toothed belt 32 is illustrated. Toothed belt 32 includes main elastomeric belt body portion 12 and sheave contact portion 14 as in the case of the belts of FIGS. 1 and 2, and also includes load-carrying section 20 as previously described for the belts of FIGS. 1 and 2. For synchronous belt 32 however, sheave contact portion 14 is in the form of alternating teeth 16 and land portions 19. Reinforcing fabric 24 as furthermore described above for the belts of FIGS. 1 and 2 may also be utilized and in this case intimately fits along alternating teeth 16 and land portions 19 of belt 32 to form a face cover therefor.

In each of the cases of FIGS. 1-3 shown above, main belt body portion 12 may be formed of any suitable cured elastomer composition, and may be of the same as or different from that described below in relation to optional adhesive rubber member 18. Suitable elastomers that may be utilized for this purpose include for example polyurethane elastomers (including as well polyurethane/urea elastomers) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); ethylene vinylacetate elastomers (EVM); ethylene methylacrylate (EAM); and silicone rubber, or a combination of any two or more of the foregoing.

To form the elastomeric belt body portion 12 in accordance with an embodiment of the present invention, the elastomer(s) may be blended with conventional rubber compounding ingredients including fillers, plasticizers, stabilizers, vulcanization agents/curatives and accelerators, in amounts conventionally employed. For example, for use with ethylene-alpha-olefin elastomer and diene elastomers such as HNBR, one or more metal salts of alpha-beta organic acids may be employed in amounts now conventionally utilized to improve dynamic performance of the resultant article. Thus zinc dimethacrylate and/or zinc diacrylate may be utilized in such compositions in amounts of from about 1 to about 50 phr; or alternatively of from about 5 to about 30 phr; or of from about 10 to about 25 phr. These materials furthermore contribute to the adhesiveness of the composition, and increase the overall cross-link density of the polymer upon curing with peroxide or related agents through ionic crosslinking.

One skilled in the relevant art would readily appreciate any number of suitable compositions for utilization in or as the elastomeric portions of the belt. A number of suitable elastomer compositions are described for example in The R. T. Vanderbilt Rubber Handbook (13th ed., 1996), and with respect to EPM or EPDM compositions and such compositions having particular high tensile modulus properties, are furthermore set forth in U.S. Pat. Nos. 5,610,217, and 6,616,558 respectively, the contents of which, with respect to various elastomer compositions that may be suitable for use in the formation of power transmission belt body portions, are specifically incorporated herein by reference. In addition, with respect to several cast PU compositions that may also be utilized in the practice of various embodiments of the present invention, such compositions are described for example in WO 09602584 to Wu et al., and the contents of that international patent application with respect to same are incorporated herein by reference.

Elastomeric main belt body portion 12 may moreover be loaded with discontinuous fibers as is well known in the art, utilizing materials such as including but not limited to cotton, polyester, fiberglass, aramid and nylon, in such forms as staple- or chopped fibers, flock or pulp, in amounts generally employed. In a preferred embodiment relating to profiled (e.g., as by cutting or grinding) multi-v-ribbed belts, such fiber loading is preferably formed and arranged such that a substantial portion of the fibers are formed and arranged to lay in a direction generally transverse the direction of travel of the belt. In molded multi-v-ribbed belts and/or synchronous belts made according to flow through methods however, the fiber loading would generally lack the same degree of orientation.

In accordance with one embodiment of the present invention, the cured composition for utilization in at least partial contact with the load carrier cord within the composite belt structure as described in several embodiments above for FIGS. 1-3 may optionally include the features and benefits thereof described in detail in aforementioned U.S. Pat. No. 6,616,558, the contents of which have been incorporated herein by reference.

Various terms are utilized in the art to describe the twist of yarns and of cords. In the present context "Base Yarn" refers to a bundle of filaments or fibers in the form as received from a base-yarn manufacturer, which may include twisted yarn or yarn with no twist. "Strand" or "yarn" or "ply" refers to a base yarn or yarns that have been folded or twisted or plied or cabled as an intermediate step in forming a cord. "Cord" refers to one or more strands, plies, or yarns that have been twisted or plied or cabled together in a final step in forming the cord. The term "twist multiplier" or "TM" will be utilized to describe the twist feature as it applies to the practice of the present invention, and is defined as the ratio of the turns per inch (TPI) to the square root of the yarn count. Yarn count is defined as the ratio of 5315 to the end denier in grams per 9000 meters. Thus, the following equation defines the twist multiplier:

$$TM = \frac{TPI}{\sqrt{5315/denier}}.$$

To describe a first and second TM in the construction of cords, the following convention will be followed herein: "2×6"=a first TM of 2 and a second TM of 6. To describe the number of base yarns and strands used in the construction of cords, the following convention will be followed herein: "y–n/m"=an integer number "n" of a base yarn of "y" denier per end forms each of the "m" strands of the cord. Thus the total strand size (in denier) after the first twist step is the product y times n. The total cord size (in denier) after the second twist step is the product y times n times m.

The base yarn size is not limited in the practice of the invention, but is only limited by the availability of base yarns from the manufacturers. The final cord size is not particularly limited in the practice of the invention, but may be controlled as desired for a particular application by suitable choice of "n" and "m". There is often, however, a practical upper limit on choice of "n" and "m" due to increased equipment and handling costs for exceedingly many ends. Thus, "n" may be in the range of from 1 to about 10, and "m" may be in the range of from 1 to about 12. In one embodiment of the invention, base yarns of from about 400 denier to about 3000 denier may be used. Thus, strand size after the first twist step may be in the range of from about 400 to about 30,000 denier, and cord size after the second twist step may be in the range of from about 400 to about 360,000 denier. The cord used in the present invention may comprise six yarns of A360 or equivalent PET fiber in a ⅔ cable construction.

The methods and machinery used for twisting and plying the strands and the cord are not particularly limited. Suitable textile twisting machines include for example a ring twister, a 2-for-1 twister, a direct cabler, and any other twister known in the art. The twist levels and cord construction for the invention are not particularly limited, but may suitably be chosen for the given application.

The load carrier cords in accordance with an embodiment of the invention may be treated with one or more adhesive compositions utilizing any suitable and/or conventional materials and application processes, in order to establish or improve their adhesion to the surrounding elastomer constituents of the article. For example the cord may be treated with an adhesive, or adhesives, to bond the filaments to each other and to promote the adhesion of the cord to the elastomeric portion of the belt. In accordance with one embodiment, the cord could be first treated with a primer, which could be either aqueous-based or solvent-based, such as polyisocyanates and epoxy compounds. The treated cord could be then treated with another conventional and/or otherwise suitable adhesive such as resorcinol formaldehyde latex (RFL). After each treatment, the cord is generally passed through an oven or a series of ovens at temperatures from 100° C. to 290° C. to dry and cure the adhesives. Optionally the cord could be then treated with an additional overcoat adhesive, e.g., a mixture of high emulsions, pigments and curatives in a water-based medium, or a mixture of pigments and curatives with dissolved polymers in a solvent solution such as those available under the trademark CHEMLOK by Lord Corporation, or other suitable rubber cements, for additional adhesion improvement.

Alternatively, e.g., when the surrounding elastomer constituents are of a castable PU elastomer, such treatment may be limited to application of a primer, or may be further modified or eliminated altogether. Any suitable cord treatment process may be utilized however, and as an example U.S. Pat. No. 5,807,194 discloses a method for treating cords for utilization in cast-PU-based endless belts, and the relevant contents thereof are hereby incorporated herein by reference.

Any suitable and/or conventional method may be utilized to form the belts in accordance with various embodiments of the present invention. For example, where non-castable belt elastomers are utilized, i.e., millable rubbers, either with or without fiber loading, the belt building steps may include those of positioning an optional fabric cover element as described above within an appropriately configured mold cavity having grooved portions for the formation of teeth or ribs or notches, or upon a suitably configured belt-building drum or mandrel; disposing the load carrier cord against the second surface of the fabric cover element, such as by helically winding one or more tensile cords about the fabric; disposing elastomeric material against the tensile member; disposing additional alternating arrangements of tensile members and/or elastomeric material against this tensile member as required of a given construction; applying sufficient temperature and pressure to cure or vulcanize the elastomer materials; and removing the assembly from the mold cavity or mandrel.

Where castable belt body portions are utilized, e.g., in toothed PU belt manufacture, the production steps may furthermore include optionally wrapping a wear-resistant fabric about the surface of a grooved mold portion in a manner such that the first surface of the fabric cover element is adjacent the grooved mold portion; applying the load carrier cord about the wear-resistant fabric such as by helically winding one or more tensile cords about the fabric; introducing a substantially liquid elastomeric material into the mold cavity; and polymerizing the thus formed product. The tooth portions of such belts may moreover have any suitable shape, including curvilinear, trapezoidal, etc.

Figure 4:
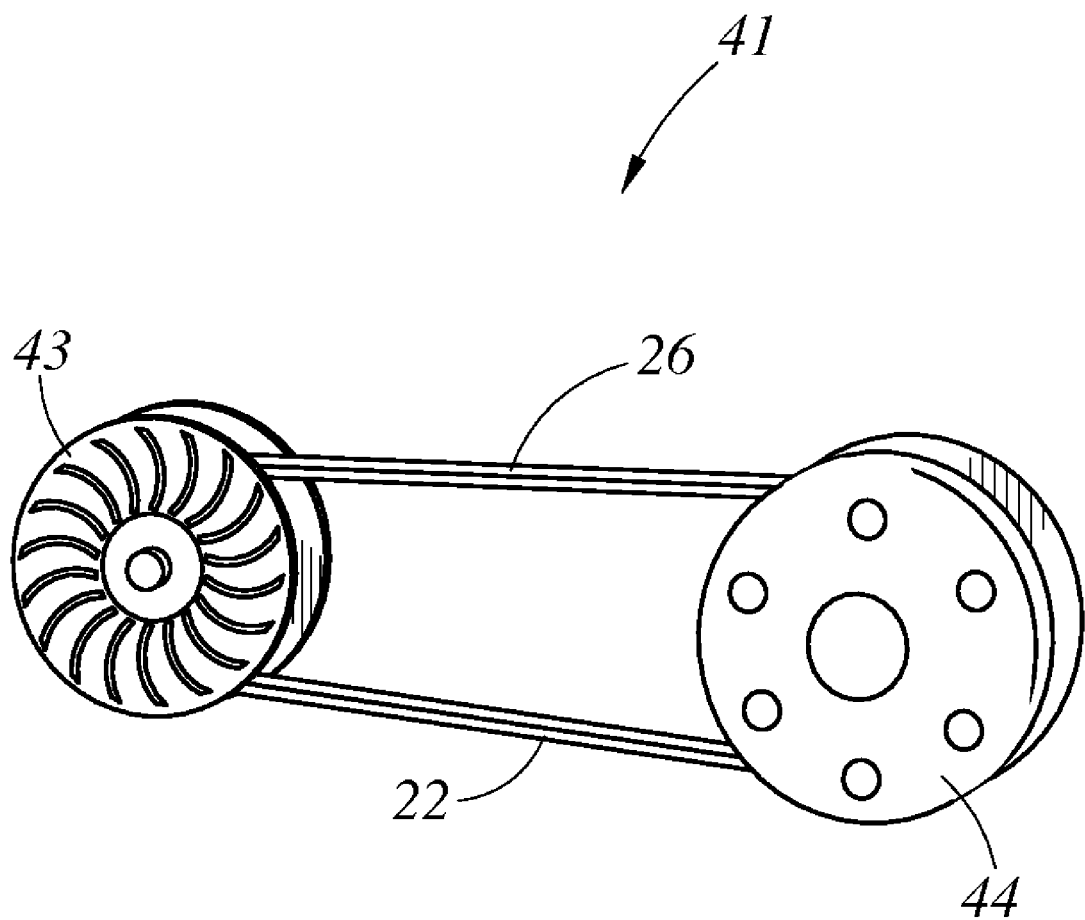
FIG. 4 is a perspective view of a system embodiment of the invention.

It has been found that load carrying cords constructed of A360 or A363 or equivalent polyester material having DSI less than about 6%, in accordance with various embodiments of the present invention as described herein when utilized in the construction of V-belts have resulted in such belts exhibiting significantly improved performance, especially on variable speed drives compared to similar belts incorporating conventional load carrying cords. FIG. 4 illustrates an embodiment of a variable speed drive. Referring to FIG. 4, variable speed drive 41 comprises V-belt 26 and sheave 43 and sheave 44. One or both of sheaves 43 and 44 may be variable speed sheaves comprising two half-sheaves which are adjustable in spacing. Thus, belt 26 may be run at a number of discrete positions or continuously variable positions or radii, providing a number of discrete speed ratios or a continuously variable speed ratio over some range of speed ratios. V-belt 26 comprises tensile cord 22 which comprises A360 or equivalent polyester yarn as described above.

EXAMPLE

A comparison of base yarn properties for the inventive cord versus several other conventional yarns is shown in Table 1, based on typical supplier data. Here, DSI is based on elongation at specified load ("EASL") of 4.5 g/d plus free heat shrinkage in air at 177° C. ("HS"). The example cord, utilizing A360 polyester, has the lowest heat shrinkage of any other type of polyester, including PEN, and it has comparable or higher modulus than the other polyesters. Thus, the DSI is significantly lower than other polyester or PEN.

Twisted cords of A360 with a 1650-⅔ construction were prepared and tested for heat shrinkage in hot oil at 35.6 N (8.01 lbs) pre-tension and for 3 minutes at 100° C. or 150° C. The resulting heat shrinkage in oil at 100° C. was 0.68%, and at 150° C. was 1.48%. The same twisted cords were also measured for heat shrinkage in air, 2 minutes at 177° C., 0.05 g/d pre-tension, with a result of 1.1% shrinkage. Thermoforce at 100° C. was 18.51 N (4.10 lbs), and at 150° C. was 21.29 N (4.79 lbs). This shrinkage is considered very low compared to conventional polyester cords including DSP or HMLS polyester cords. DSP cords of 6,000 d had heat shrinkage in oil at 100 and 150° C. of 1.4 and 2.4%, respectively.

A cogged V-belt with back jacket, EPDM rubber, and cog jacket was constructed utilizing the above A360 cord. The belt had a 30° V-angle. Additional cords of conventional construction were made into otherwise identical belts for comparison purposes. A belt was fitted to a scooter with a variable speed drive. A road test was conducted involving warm up periods at various engine speeds, multiple acceleration ramps, followed by a speed ratio measurement over the useful rpm range of 2000-7000 rpm, repeated three times to get an average. The entire test was repeated six times to determine speed ratio stability. The effective length change was determined from a center distance measurement on two pulleys according to SAE J636 or RMA IP-26. The outside circumference or length change was determined by direct measurement with pi-tape before and after testing. Both effective length change and outside length change after the six repeats are reported as a percent of the initial length or outside length. The heat shrinkage of the belt after 24 hours at 100° C. was also measured. The belt results are shown in Table 2.

TABLE 1

| Belt Variable | Base Yarn Material | Relative cord cost estimate | Yarn Tensile Strength (g/d) | EASL 4.5 g/d | Heat Shrinkage 177° C. | DSI (base yarn) EASL + HS |
|---|---|---|---|---|---|---|
| Ex. 1 | A360 | 1.1 | 7 | 3.3% | 2.0% | 5.3% |
| Comp. Ex. 2 | Conventional PET | 1 | 7 | 5.7% | 8.8% | 14.5% |
| Comp. Ex. 3 | Conventional DSP or HMLS | 1 | 8 | 3.9% | 4.5% | 8.4% |
| Comp. Ex. 4 | PEN | 3.5 | 9 | 1.2% | 5.5% | 8.4% |
| Comp. Ex. 5 | Para-Aramid | 8 | 22 | 0.9% | 0% | 0.9% |
| Comp. Ex. 6 | Rayon | ~2 | 5.5 | — | — | ~5.5% |
| Comp. Ex. 7 | Fiberglass | ~3 | — | — | — | — |

TABLE 2

| Belt Variable | Cord Material | DSI | Belt Heat Shrinkage (24 hr at 100° C.) | Belt Effective length change (RMA IP-26) | Belt Outside length change |
|---|---|---|---|---|---|
| Ex. 1 | A360 | 5.5% | 0.73% | -1.06% | -0.68% |
| Comp. Ex. 2 | Conventional PET | 16% | — | — | — |
| Comp. Ex. 3(a) | Conventional DSP 6000 d | 9.5% | 1.4% | -7.9% | ~8.1% |
| Comp. Ex. 3(b) | Conventional DSP 10,000 d | 9.5% | 1.2% | -4% | -4.3% |
| Comp. Ex. 4 | PEN | ~8% | 0.65% | -1.1% | -1.5% |
| Comp. Ex. 5 | Aramid | ~1% | 0.13% | — | — |

The results in Table 2 show that the inventive belt, Ex. 1, with A360 polyester cord performs much better than conventional PET or DSP and comparably to much more expensive materials such as PEN. The inventive scooter belt, Ex. 1, provided a very stable speed ratio on the scooter testing as well as very low dimensional change. When the speed ratio over the useful rpm range of 2000-7000 rpm was determined and plotted after each of the six repeated tests described above, the six curves coincided very closely, indicating no deterioration of shifting performance over the course of the scooter testing.

It is believed that tensile cord of A360 or equivalent PET may advantageously be used as the tensile member in almost all types of power transmission belts, especially in applications demanding high dimensional stability. Cord utilizing A360 or equivalent PET could be constructed, treated, and advantageously and economically used in the place of conventional polyester, PEN, aramid cord, rayon, or other fibers.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A power transmission belt comprising a tensile cord comprising polyester; the cord characterized by at least one of a heat shrinkage at 100° C. of less than 1%, a heat shrinkage at 150° C. of less than about 1.5%, and a Dimensional Stability Index of less than about 6%; and the belt characterized by a heat shrinkage after 24 hours at 100° C. of less than 1%; with said Index calculated as the sum of percent elongation at 4.5 g/d tensile load and percent heat shrinkage in air at 177° C.

2. The belt of claim 1 wherein the polyester comprises polyethylene terephthalate yarn characterized by a tensile strength of about 7 g/d, a heat shrinkage in air at 177° C. of about 2%, a percent elongation at 4.5 g/d tensile load of about 3%, and a Dimensional Stability Index of less than about 6%.

3. The belt of claim 2 selected from the group consisting of a V-belt, a synchronous belt, and a multi-v-ribbed belt.

4. The belt of claim 3 in the form of a V-belt and adapted for use in a variable-speed belt drive.

5. A variable speed belt drive comprising a sheave and a belt; the belt comprising a tensile cord of polyester; the cord characterized by at least one of a heat shrinkage at 100° C. of less than 1%, a heat shrinkage at 150° C. of less than about 1.5%, and a Dimensional Stability Index of less than about 6%; and the belt characterized by a heat shrinkage after 24 hours at 100° C. of less than 1%; with said Index calculated as the sum of percent elongation at 4.5 g/d tensile load and percent heat shrinkage in air at 177° C.

6. The drive of claim 5 wherein the polyester comprises polyethylene terephthalate yarn characterized by a tensile strength of about 7 g/d, a heat shrinkage in air at 177° C. of about 2%, a percent elongation at 4.5 g/d tensile load of about 3%, and a Dimensional Stability Index of less than about 6%.

7. The drive of claim 6 wherein said belt is a V-belt and said sheave is adjustable.

* * * * *